(12) United States Patent
Ruona et al.

(10) Patent No.: US 8,925,302 B2
(45) Date of Patent: Jan. 6, 2015

(54) METHOD AND SYSTEM FOR OPERATING AN ENGINE TURBOCHARGER

(75) Inventors: William Charles Ruona, Farmington Hills, MI (US); Kevin Durand Byrd, Royal Oak, MI (US); Keith Michael Plagens, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 13/598,396

(22) Filed: Aug. 29, 2012

(65) Prior Publication Data

US 2014/0060006 A1 Mar. 6, 2014

(51) Int. Cl.
F01N 3/00 (2006.01)

(52) U.S. Cl.
USPC .............. 60/280; 60/274; 60/278; 60/285; 60/605.2; 60/614

(58) Field of Classification Search
CPC .............. F01N 2340/06; F01N 3/0236; F01N 2900/1404; F02M 25/07; F02M 25/0705; F02M 25/071; F02M 25/0711; F02M 25/0712; F02M 25/0713; F02M 25/0739; F02M 25/074
USPC .............. 60/274, 276, 278, 280, 285, 605.02, 60/614, 624
See application file for complete search history.

(56) References Cited

U.S. PATENT DOCUMENTS

| | | | |
|---|---|---|---|
| 4,884,407 A * | 12/1989 | Hatanaka | 60/614 |
| 4,897,998 A * | 2/1990 | Sekiyama et al. | 60/614 |
| 5,133,188 A * | 7/1992 | Okada | 60/609 |
| 5,142,868 A * | 9/1992 | Woon et al. | 60/624 |
| 6,539,716 B2 * | 4/2003 | Finger et al. | 60/605.2 |
| 6,637,204 B2 | 10/2003 | Ellmer et al. | |
| 8,347,613 B2 * | 1/2013 | Van Nieuwstadt | 60/297 |
| 2002/0078934 A1 | 6/2002 | Hohkita et al. | |
| 2007/0234982 A1 | 10/2007 | Kolmanovsky et al. | |
| 2007/0234985 A1 | 10/2007 | Kolmanovsky | |
| 2008/0190107 A1 | 8/2008 | Ogiso | |
| 2009/0292446 A1 | 11/2009 | Tanaka | |
| 2010/0011764 A1 | 1/2010 | Andrews | |
| 2011/0107739 A1 | 5/2011 | Shimizu et al. | |

FOREIGN PATENT DOCUMENTS

EP 1004760 A2 11/1999
JP 2006194170 A 7/2006

OTHER PUBLICATIONS

Stanek, Joe F. et al., "Method and System for Improving Stopping and Starting of a Turbocharged Engine," U.S. Appl. No. 13/598,473, Filed Aug. 29, 2012, 45 pages.

Byrd, Kevin Durand et al., "Method and System for Improving Stopping and Starting of a Turbocharged Engine," U.S. Appl. No. 13/598,427, Filed Aug. 29, 2012, 29 pages.

* cited by examiner

*Primary Examiner* — Binh Q Tran

(74) *Attorney, Agent, or Firm* — Julia Voutyras; Alleman Hall McCoy Russell & Tuttle LLP

(57) ABSTRACT

A system and method for operating an engine turbocharger is described. In one example, the turbocharger is rotated in different directions in response to operating conditions. The system and method may reduce engine emissions.

20 Claims, 6 Drawing Sheets

US 8,925,302 B2

METHOD AND SYSTEM FOR OPERATING AN ENGINE TURBOCHARGER

BACKGROUND/SUMMARY

It may be desirable to reduce engine emissions at time of engine starting so that average engine emissions over a driving cycle may be reduced. One way to improve engine emissions at the time of starting is to operate an engine rich and to supply air to an exhaust system coupled to the engine. Such operation allows engine exhaust gas constituents to be oxidized in the exhaust system. In particular, hydrocarbons in the exhaust gases may be oxidized when combined with air introduced to the exhaust system. The oxidizing hydrocarbons release heat that may be transferred to an after treatment devices in the exhaust system. The heat transfer reduces an amount of time that it takes for the after treatment device to reach operating temperature. Consequently, the after treatment device may begin to convert exhaust constituents to more desirable compounds sooner after engine starting, thereby reducing engine emissions. However, systems that inject air into an engine exhaust system increase system cost and may be less reliable than systems that do not inject air into engine exhaust.

The inventors herein have recognized the above-mentioned limitations and have developed a method for operating an engine, comprising: rotating a turbocharger coupled to the engine in a first direction to increase a time engine exhaust gases are in an exhaust manifold; and rotating the turbocharger in a second direction different than the first direction to increase engine output torque.

By rotating a turbocharger in two different directions, it may be possible to both improve engine emissions and engine power output. For example, after an engine start, a turbocharger may be rotated in a first direction opposed to a direction that engine exhaust gases drive the turbocharger so that exhaust gases experience a greater latency time in the engine exhaust manifold. A greater latency time may allow for more complete oxidation of exhaust gases in the exhaust manifold so that engine emissions may be improved. Additionally, rotating the turbocharger in a first direction opposed to a direction the turbocharger rotates when acted upon by exhaust gases exiting engine cylinders may increase exhaust back pressure which may also help to improve engine emissions during some conditions. Subsequently, the turbocharger may be rotated in a second direction that pressurizes air entering the engine to increase engine performance.

The present description may provide several advantages. In particular, the approach may reduce engine emissions during an engine cold start. Further, the approach may reduce fuel consumption by reducing catalyst light off time so that an amount of time the engine is operated less efficiently may be reduced. Additionally, the approach may provide for a more reliable way to reduce engine emissions as compared to systems that utilize secondary air injection to the exhaust system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
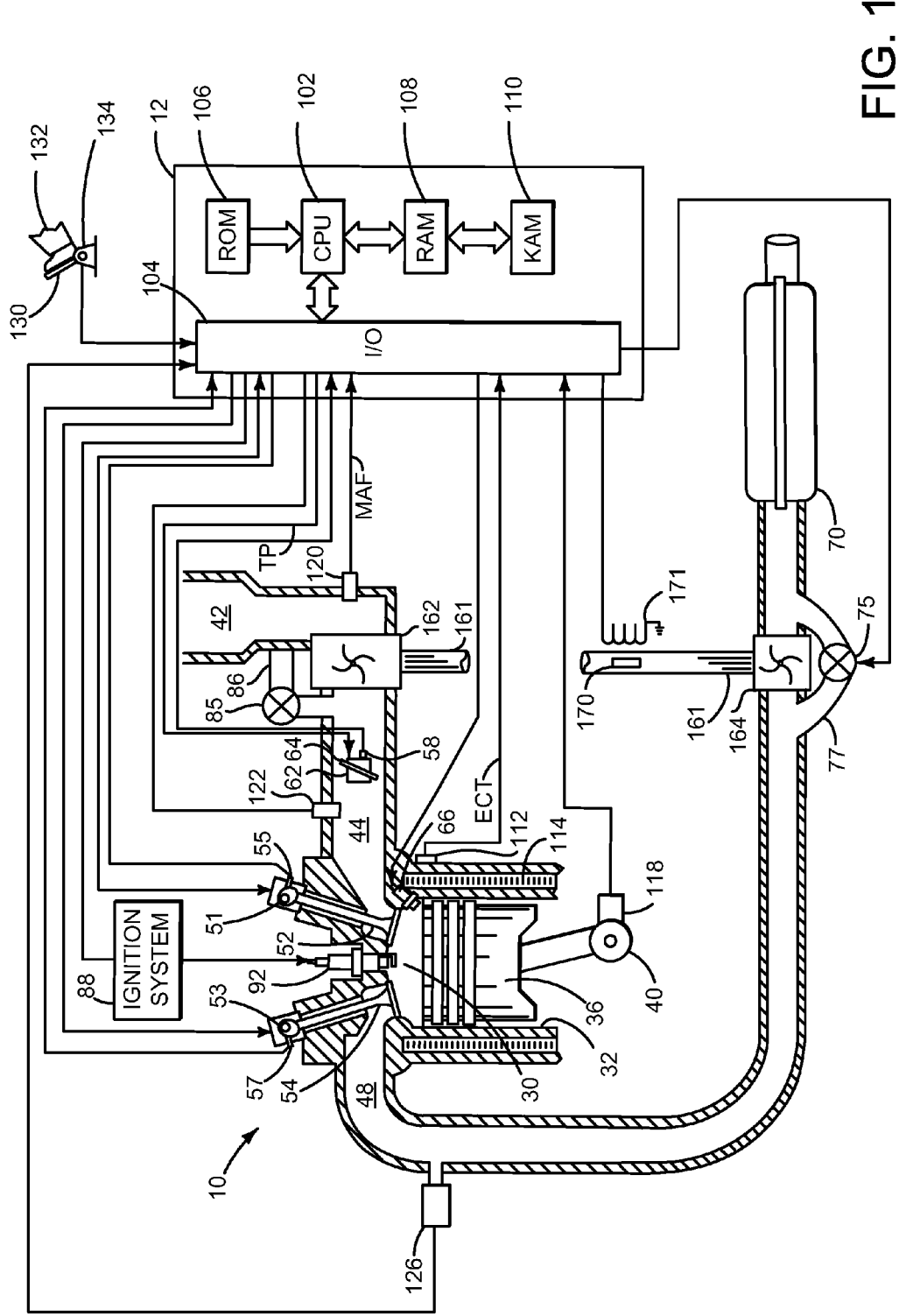
FIG. 1 shows a schematic depiction of an engine.
Figure 2:
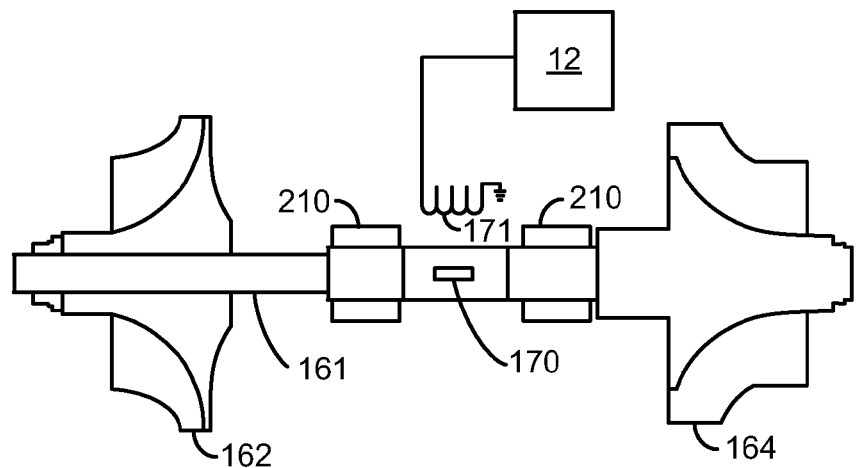
FIGS. 2 and 3 show example devices for changing rotational direction of a turbocharger.
Figure 3:
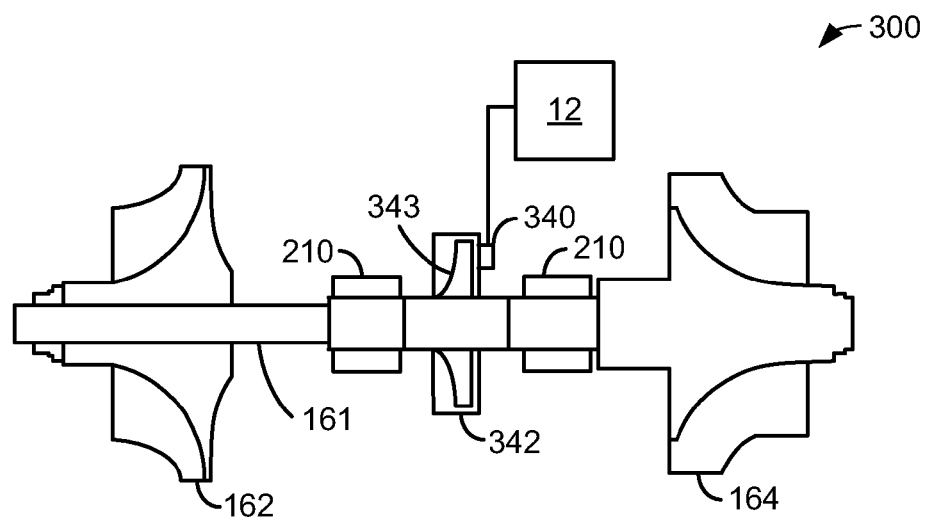
Figure 4:
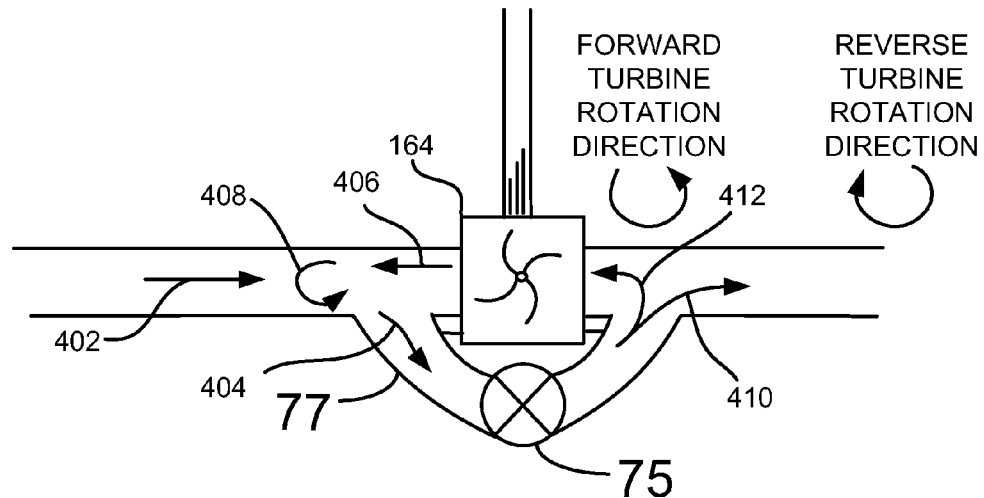
FIGS. 4 and 5 show example conditions when a turbocharger turbine is rotated in a direction opposed to a direction the turbocharger turbine rotates when driven via engine exhaust gases exiting engine cylinders.
Figure 5:
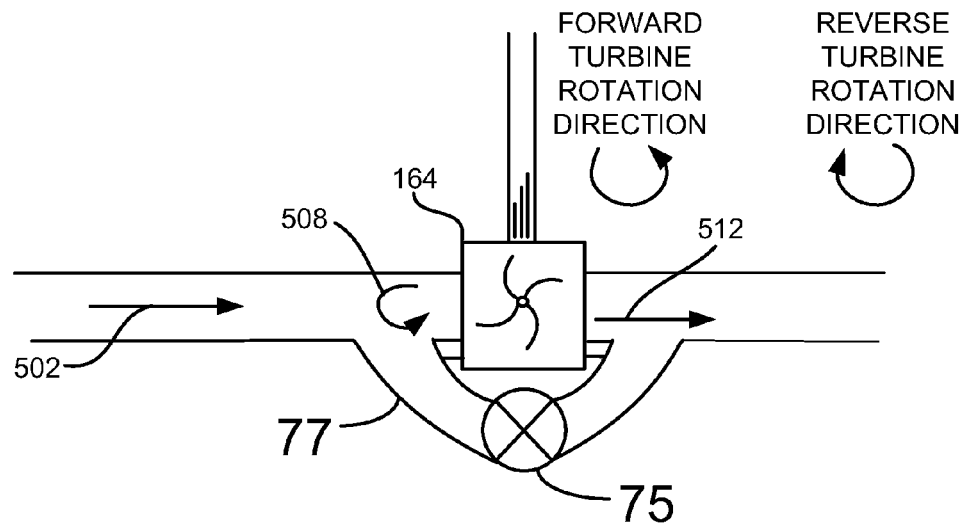
Figure 6:
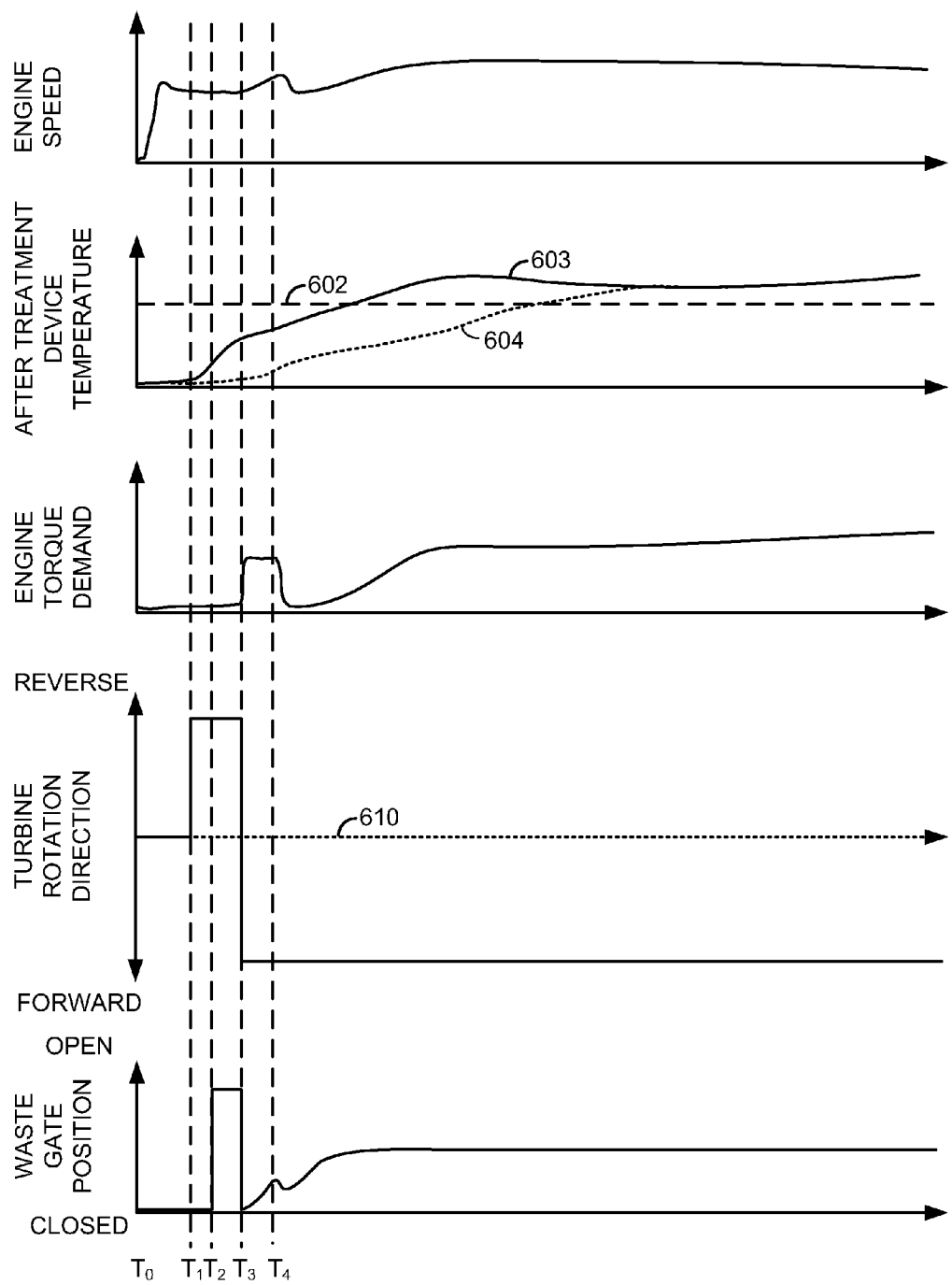
FIGS. 6 and 7 show simulated engine cold starting sequences.
Figure 7:
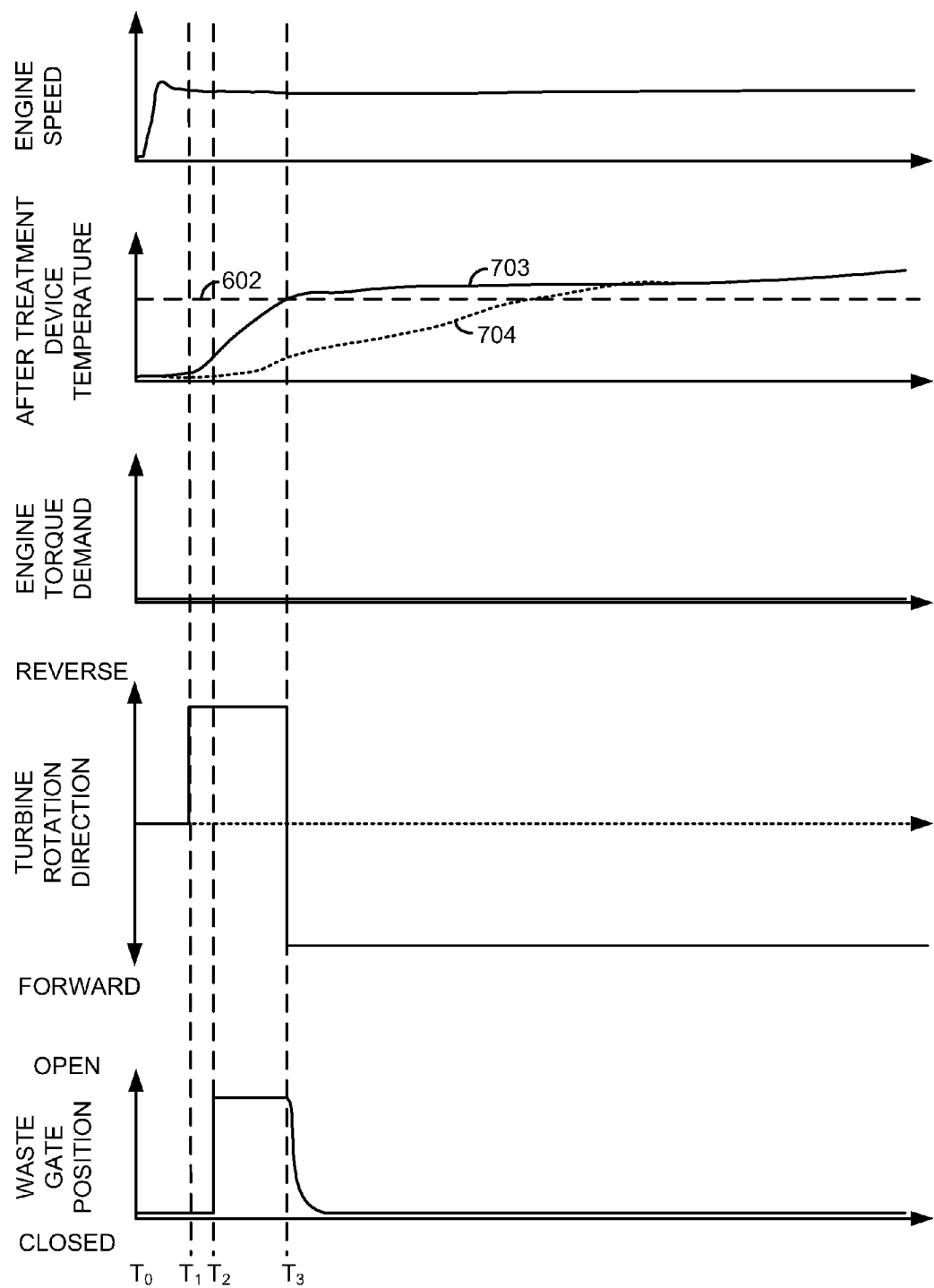
Figure 8:
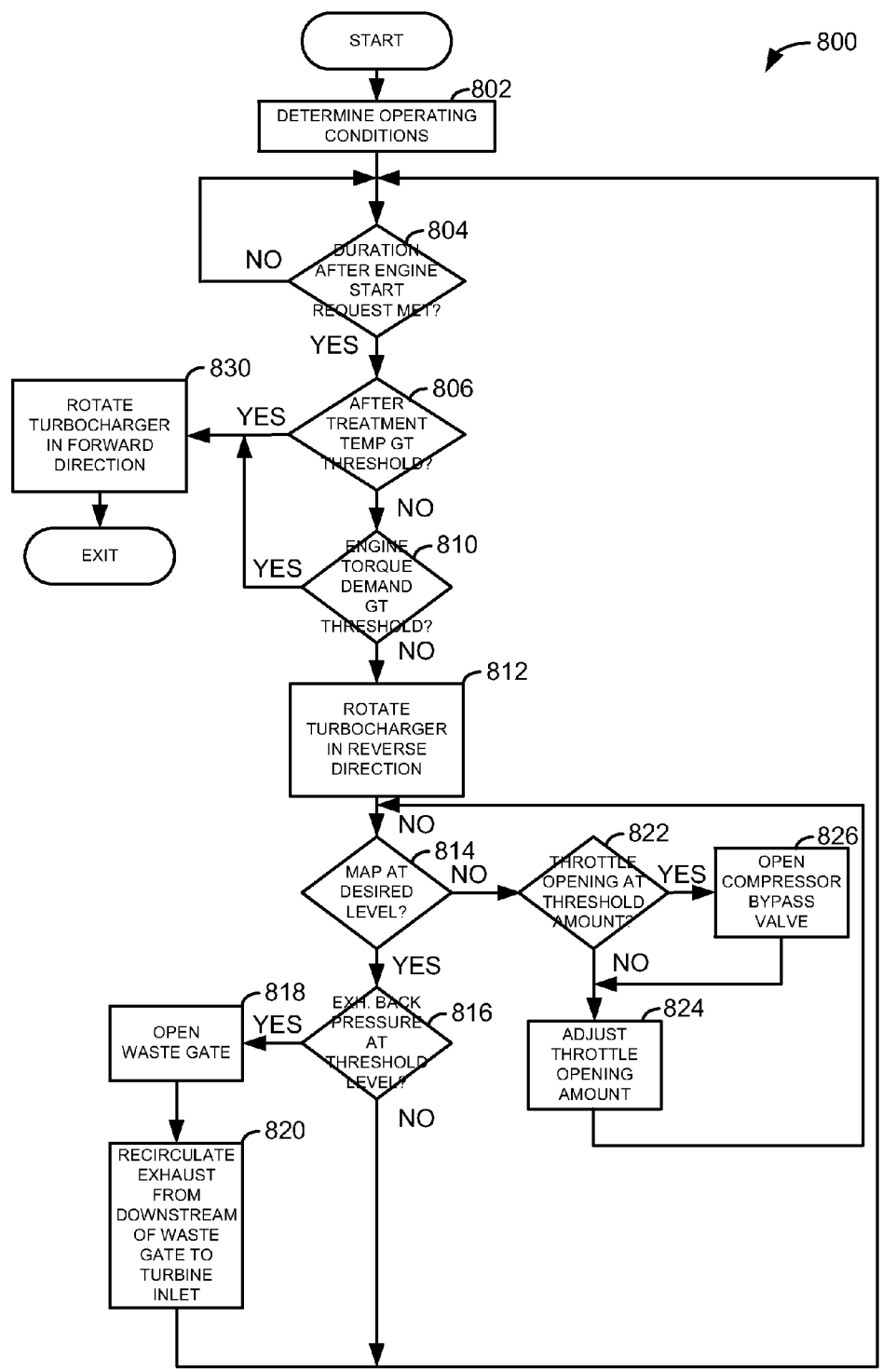
FIG. 8 shows an example method for operating a turbocharger.

The present description is related to operating a turbocharger. In one example, a turbocharger turbine rotates in a direction determined by exhaust flow from engine cylinders. In another example, the turbocharger turbine rotates in a direction opposite the direction the turbine rotates when driven by engine exhaust gases. The approach may improve engine emissions by improving oxidation of exhaust gases in an exhaust manifold. One example system is shown in FIG. 1. The engine and turbocharger may be operated to provide the sequences of FIGS. 6 and 7 via the method shown in FIG. 8. Example turbochargers are shown in FIGS. 2 and 3. FIGS. 4 and 5 show exhaust flow in the vicinity of a turbocharger according to the method of FIG. 8. Engine starting sequences according to the method of FIG. 8 are shown in FIGS. 6 and 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Further, a compressor bypass passage 86 may be provided in some examples to limit pressure provided by compressor 162. Flow though bypass passage 86 is regulated via valve 85. In this example, a first magnetic field is provided by windings, or alternatively permanent magnets, 170 coupled to shaft 161, and winding 171 provides a second magnetic field when supplied current via controller 12. The two magnetic fields can rotate or hold shaft 161 so as to control the rotational direction of compressor 162 and turbine 164. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system, such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a cross section of a first device for reversing rotational direction of a turbocharger is shown. Turbine 164 is shown mechanically coupled to shaft 161. Compressor 162 is also shown mechanically coupled to shaft 161. Shaft 161 is supported via bearings 210.

During engine operation, exhaust gases act on turbine 164 to cause it to rotate in a first direction, thereby rotating shaft 161 and compressor 162. However, in selected engine operating conditions (e.g., at idle speed after engine starting), current may flow through winding 171 via controller 12 to produce a first magnetic field. A second magnetic field produced by winding, or alternatively permanent magnets 170, is attracted to and/or repelled from the first magnetic field to rotate or hold stationary shaft 161. Applying current to winding 171 allows a magnetic field to rotate shaft 161 in a direction opposite to the direction shaft 161 rotates when exhaust gas applies force to turbine 164.

Referring now to FIG. 3, a cross section of an alternative device 300 for reversing rotational direction of a turbocharger is shown. The components of device 300 that have the same numbers as the components of the device shown in FIG. 2 are the same components as shown in FIG. 2, and the components operate as discussed in the description of FIG. 2.

Device 300 includes a hydraulic flow control device (e.g., a valve) 340 and a hydraulic pump 342. Hydraulic pump is integrated with shaft 161 and may include vanes 343. Shaft 161 may rotate via opening valve 340 which allows hydraulic fluid such as oil to enter hydraulic pump 342. Opening valve 340 allows oil to operate on vanes 343 to rotate shaft 161 in a direction opposite to the direction shaft 161 rotates when exhaust gas applies force to turbine 164. In one example, hydraulic pump 342 may be hydraulically driven in a single direction to provide reverse turbine rotation.

Referring now to FIG. 4, example gas flow conditions proximate to a turbocharger when a turbine is rotated in a direction opposite to a direction the turbine rotates when driven via exhaust gases is shown. In this example, waste gate valve 75 is in an open state allowing exhaust gases to flow through bypass 77. Exhaust gases ejected from engine cylinders flow in the direction indicated by arrow 402. The engine exhaust gases mix with exhaust gases transported from downstream (e.g., in the direction of exhaust flow from engine cylinders) turbine 164 as indicated by arrow 408. Turbine 164 supplies exhaust gases to upstream of turbine 164 in the direction of arrow 406 when rotated in a reverse direction via electromechanical or hydraulic actuator (e.g., the devices shown in FIGS. 2 and 3). Mixed exhaust gases flow in the direction of arrow 404 through waste gate valve 75 via passage 77 when waste gate valve 75 is open as is shown. Exhaust gases exit waste gate 75 and flow toward atmosphere as indicated by arrow 410 or are recirculated in the direction of arrow 412. In this example, directions of forward and reverse turbine rotation are as indicated.

Thus, by rotating in a reverse direction via hydraulic or electric motive force, exhaust gases are drawn through turbine 164 and returned to upstream of turbine 164. By rotating turbine 164 in a reverse direction, the latency time of exhaust gases upstream of turbine 164 is increased so that more complete oxidation of exhaust gases may occur. Such an exhaust flow pattern may be created shortly after an engine is restarted so that exhaust gas oxidation in the exhaust system is more complete.

Referring now to FIG. 5, example gas flow conditions proximate to a turbocharger when a turbine is rotated in a direction opposite to a direction the turbine rotates when driven via exhaust gases is shown. In this example, waste gate valve 75 is in a closed state stopping exhaust gases from flowing through bypass 77. Exhaust gases ejected from engine cylinders flow in the direction indicated by arrow 502. The engine exhaust gases mix with exhaust gases transported from downstream (e.g., in the direction of exhaust flow from engine cylinders) turbine 164 as indicated by arrow 508. Turbine 164 supplies exhaust gases to upstream of turbine 164 when rotated in a reverse direction via electromechanical or hydraulic actuator (e.g., the devices shown in FIGS. 2 and 3). Substantially zero exhaust flows through bypass passage 77 when waste gate 75 is in a closed state. A small amount of exhaust gas may pass by turbine 164 to downstream of turbine 164 as indicated by arrow 512. In some examples, waste gate 75 may only be in a closed state for a short duration so that a sufficient amount of exhaust gases can be evacuated from engine cylinders so that the engine may continue to operate.

Thus, by rotating in a reverse direction via hydraulic or electric motive force, exhaust gases and/or air may be drawn through turbine 164 and returned to upstream of turbine 164. By rotating turbine 164 in a reverse direction, the latency time of exhaust gases upstream of turbine 164 is increased so that more complete oxidation of exhaust gases may occur. Such an exhaust flow pattern may be provided during and shortly after engine run-up (e.g., time between when engine speed is between cranking speed and idle speed.

Referring now to FIG. 6, a simulated engine cold starting sequence is shown. The sequence of FIG. 6 may be provided via the system shown in FIGS. 1-3 executing instructions stored in non-transitory memory according to the method of FIG. 8.

The first plot from the top of FIG. 6 shows engine speed versus time. The Y axis represents engine speed and the X axis represents time. Time increases from the left side of the figure to the right side of the figure. Engine speed increases in the direction of the Y axis arrow.

The second plot from the top of FIG. 6 shows exhaust after treatment device temperature (e.g., catalyst temperature) versus time. The Y axis represents exhaust after treatment device temperature and the X axis represents time. Time increases from the left side of the figure to the right side of the figure. Exhaust after treatment device temperature increases in the direction of the Y axis arrow. Horizontal line 602 represents a threshold after treatment device temperature. For example, the after treatment device is operating with an expected level of efficiency when the after treatment device is above threshold temperature 602. The after treatment device is operating with less than the expected level of efficiency when the after treatment device is less than threshold temperature 602. Trace 603 represents after treatment device temperature when the engine is operated according to the method of FIG. 8. Trace 604 represents after treatment device temperature when the engine is operated not according to the method of FIG. 8.

The third plot from the top of FIG. 6 shows engine torque demand versus time. The Y axis represents engine torque demand and the X axis represents time. Time increases from the left side of the figure to the right side of the figure. Engine torque demand increases in the direction of the Y axis arrow.

The fourth plot from the top of FIG. 6 shows turbine rotation direction versus time. The Y axis represents turbine rotation direction and the X axis represents time. Time increases from the left side of the figure to the right side of the figure. Turbine rotation direction is in reverse when above line 610 and forward when below line 610. Forward direction for the turbine is the direction the turbine rotates when exhausts rotate the turbine and not when the turbine is rotated electrically or hydraulically.

The fifth plot from the top of FIG. 6 shows turbocharger waste gate position versus time. The Y axis represents waste gate position and the X axis represents time. Time increases from the left side of the figure to the right side of the figure. Waste gate opening amount increases in the direction of the Y axis arrow.

At time $T_0$, the engine is stopped and the after treatment device temperature is at a low level. The engine torque demand is also low and the turbine is not rotating. Further, the turbocharger waste gate is in a closed position.

Between time $T_0$ and time $T_1$, the engine is started in response to an engine start request as indicated by the increasing engine speed. The after treatment device temperature is low, but it begins to increase. The engine torque demand remains at a low level and the turbine is shown not rotating. However, in some examples, the turbocharger may begin to rotate in a reverse direction in response to an engine start request. The turbocharger waste gate remains held in a closed position. However, in some examples, the turbocharger waste gate may be commanded open in response to the engine starting request.

At time $T_1$, the turbine begins to rotate in a reverse direction. In particular, the turbine rotates in a direction opposite to a direction the turbine rotates when driven by exhaust gases leaving engine cylinders. In one example, the turbine rotates in the reverse direction in response to an amount of time after the engine was last stopped and in response to after treatment device temperature. Alternatively, the turbine may be reverse rotated in response to an engine speed being achieved by the engine after engine start. The after treatment device temperature begins to increase and hydrocarbons are oxidized in the exhaust manifold since reversing the turbocharger rotational direction increases the latency time of exhaust in the engine exhaust manifold. Further, the waste gate remains in a closed position, although as previously mentioned, the waste gate may be opened at an earlier time, if desired. The engine torque demand remains at the low level. Exhaust flow at the turbine at time $T_1$ is as shown in FIG. 5.

At time $T_2$, the waste gate is commanded open and exhaust gases begin to flow around the turbine as illustrated in FIG. 4. The waste gate may be commanded open in response to an exhaust backpressure level or an amount of time since the engine was last stopped. The after treatment device temperature continues to increase and the engine torque command stays at a relatively low level.

At time $T_3$, the engine torque demand is increased and the waste gate is closed in response to the increase in torque demand. The engine torque command may be increased via a driver or a controller. Additionally, force applied to the turbocharger shaft via an electric or hydraulic device ceases in response to the increasing engine torque demand. Further, the waste gate is adjusted to a closed position in response to the engine torque demand. Consequently, engine exhaust gases cause the turbine rotational direction to change from reverse to forward. The turbocharger begins to supply pressurized air to the engine after the turbine direction is reversed. Before turbine direction is reversed, the compressor also rotates in a reverse direction and does not provide pressurized air to the engine. In some examples, a compressor bypass valve may be opened to let air flow to the engine when the compressor is rotating in a reverse direction.

At time $T_4$, the engine torque demand is reduced to a low value via the vehicle driver or a controller. The engine speed begins to be reduced and the waste gate position partially closes in response to the lower engine torque request. After treatment device temperature is below threshold level 602 at time $T_4$, but it continues to increase and it eventually exceeds threshold level 602. The turbine direction of rotation remains forward after the engine torque demand is increased.

In this way, turbine direction of rotation may be reversed and then driven forward in response to an engine torque request. Rotating the turbocharger in a forward direction allows the turbocharger compressor to supply pressurized air to the engine so that the engine torque request may be met.

Referring now to FIG. 7, another simulated engine cold starting sequence is shown. The sequence of FIG. 7 may be provided via the system shown in FIGS. 1-3 executing instructions stored in non-transitory memory according to the method of FIG. 8. The plots shown in FIG. 7 are of the same signals as described in FIG. 6. Therefore, for the sake of brevity, the plot and signal descriptions are omitted and the differences between the plots are discussed. Trace 703 represents after treatment device temperature for the illustrated sequence according to the method of FIG. 8. Trace 704 represents after treatment device temperature when the method of FIG. 8 is not applied.

At time $T_0$, the engine is stopped and the after treatment device temperature is at a low level. The engine torque demand is also low and the turbine is not rotating. Further, the turbocharger waste gate is in a closed position.

Between time $T_0$ and time $T_1$, the engine is started in response to an engine start request as indicated by the increasing engine speed. The after treatment device temperature is low, but it begins to increase. The engine torque demand remains at a low level and the turbine is shown not rotating. However, in some examples, the turbocharger may begin to rotate in a reverse direction in response to an engine start request. The turbocharger waste gate remains held in a closed position. However, in some examples, the turbocharger waste gate may be commanded open in response to the engine starting request.

At time $T_1$, the turbocharger turbine is rotated in a reverse direction via an electric or hydraulic actuator that acts on a turbocharger shaft. In one example, the actuator is as described in FIG. 2 or 3. The waste gate is initially closed and the engine torque demand is at a low level. The after treatment device temperature begins to increase and hydrocarbons are oxidized in the exhaust manifold as reversing the turbocharger rotational direction increases the latency time of exhaust in the engine exhaust manifold. The turbocharger turbine may be rotated in the reverse direction in response to an amount of time after engine stop and in response to after treatment device temperature.

At time $T_2$, the after treatment device reaches threshold temperature 602. The after treatment device converts exhaust gas constituents to $CO_2$ and $H_2O$ with a desired efficiency at temperatures above 602. The turbine rotational direction and the compressor rotational direction change from a reverse direction to a forward direction in response to the after treatment device reaching the threshold temperature. In particular, supply of energy to rotate the turbine in the reverse direction ceases and the waste gate is closed so that an amount of exhaust gas acting on the turbine increases causing turbine rotational direction to change. The engine torque demand remains at a low level.

Thus, in this example where the engine torque demand is low and after treatment device temperature reaches threshold temperature 602 before the engine torque request is increased, turbine rotation direction is reversed in response to after treatment device temperature.

Referring now to FIG. 8, a method for operating a turbocharger is shown. The method of FIG. 8 may be stored as instructions in non-transitory memory of controller 12 in the system shown in FIG. 1. Further, the method of FIG. 8 may provide the operating sequences illustrated in FIGS. 6 and 7.

At 802, method 800 determines operating conditions. Operating conditions may include but are not limited to engine speed, after treatment device temperature, engine load, engine torque demand, engine temperature, intake manifold pressure, and exhaust back pressure. Method 800 proceeds to exit after operating conditions are determined.

At 804, method 800 judges whether or not a predetermined duration or condition after engine start request has been met. In one example, the predetermined duration is an amount of time or a number of combustion events since the engine was last stopped. In other examples, the predetermined condition is an engine start request. If the duration or condition after the engine start request has been met, the answer is yes and method 800 proceeds to 806. Otherwise, the answer is no and method 800 returns to 804.

At 806, method 800 judges whether or not an after treatment device (e.g., catalyst or particulate filter) temperature is greater than a threshold level. The threshold temperature level may vary for different engine operating conditions. For example, the threshold temperature may be a first temperature for engine starting at a first temperature. The threshold temperature may be a second temperature for engine starting at a second temperature, the second temperature greater than the first temperature. If after treatment device temperature is greater than the threshold temperature, the answer is yes and method 800 proceeds to 830. Otherwise, the answer is no and method 800 proceeds to 810.

At 830, method 800 ceases to provide energy to rotate the turbine in a reverse direction (e.g., a direction opposed to the direction exhaust gases exiting the engine drive the turbine) and exhaust gases are allowed to rotate the turbine in a forward direction. Additionally, if the turbine is rotating in a reverse direction with the turbocharger waste gate in an open position, the waste gate is commanded closed in response to after treatment device temperature, engine torque demand, or an amount of time since the engine was last stopped. Closing the waste gate allows the turbine to switch directions sooner than if the waste gate is allowed to remain open. After the turbine begins to rotate in a forward direction, compressed air is provided to the engine via the compressor.

At 810, method 800 judges whether or not an engine torque demand is greater than a threshold. In one example, the engine torque demand may originate from a driver of a vehicle applying an accelerator pedal as shown in FIG. 1. In other examples, the engine torque demand may originate from another controller such as a hybrid powertrain controller. If method 800 judges that the engine torque demand is greater than a threshold, the answer is yes and method 800 proceeds to 830. Otherwise, the answer is no and method 800 proceeds to 812.

At 812, method 800 rotates the turbocharger turbine and compressor in a reverse direction. In one example, the reverse direction is a direction opposite to a direction the turbine is driven when exhaust gases impinge on turbine vanes. The turbine may be driven in a reverse direction via an electrical or hydraulic actuator as shown in FIGS. 2 and 3. Method 800 proceeds to 814 after the turbine is driven in a reverse direction.

At 814, method 800 judges whether or not the engine intake manifold absolute pressure (MAP) is at a desired level. Since rotating the compressor in reverse may limit air flow into the intake manifold, MAP is checked to ensure a desired amount of air is entering the engine. If MAP is determined not to be at a desired level, the answer is no and method 800 proceeds to 822. Otherwise, the answer is yes and method 800 proceeds to 816.

At 822, method 800 judges whether or not the opening amount of the throttle is at a threshold amount (e.g., greater than 40% of available throttle opening amount). If the throttle opening amount is not at the threshold opening amount, the answer is no and method 800 proceeds to 824. If the throttle opening amount is at the threshold opening amount, the answer is yes and method 800 proceeds to 826.

At 824, the throttle opening amount is adjusted to provide the desired MAP. If MAP is less than desired MAP, the throttle opening amount is increased. If MAP is greater than desired MAP, the throttle opening amount is decreased. In one example, the throttle opening amount increase or decrease may be a function of the difference between desired MAP and actual or measured MAP. Method 800 returns to 814 after the throttle opening amount is adjusted.

At 826, method 800 opens the compressor bypass valve to increase MAP. If the compressor bypass valve is a two state valve, the compressor bypass valve is moved from a closed state to an open state. If the compressor bypass valve is adjustable between more than two states, the compressor bypass valve opening amount may be increased by a predetermined amount. Method 800 proceeds to 824 after the compressor bypass valve state is adjusted.

At 816, method 800 judges whether or not exhaust backpressure is greater than a predetermine backpressure. Further, in some examples method 800 judges if a predetermined duration since the engine was stopped has expired. If the answer to either or both conditions is yes, method 800 proceeds to 818. Otherwise, the answer is no and method 800 returns to 804.

At 818, method 800 opens the turbocharger waste gate to allow exhaust to flow around the turbine. The waste gate may be electrically or pneumatically opened. Method 800 proceeds to 820 after the waste gate is opened.

At 820, method 800 recirculates exhaust gas from downstream of the turbine (e.g., in the direction of exhaust flow from the engine to atmosphere) or waste gate to the turbine inlet via the reverse rotating turbine. In some examples, the reverse turbine rotation speed may be adjusted depending on engine operating conditions. For example, the turbine may be rotated in reverse at an increasingly higher speed as engine speed increases. Alternatively, turbine speed may be decreased as engine speed decreases. Method 800 returns to 804 after recirculation of exhaust gases commences.

In this way, the direction of turbocharger rotation may be controlled so that exhaust gases may be recirculated about a turbocharger to improve oxidation of exhaust gases. Further, reverse turbine rotation may be ceased in response to engine torque demand, time since engine stop, and after treatment device temperature.

Thus, the method of FIG. 8 provides for a method for operating an engine, comprising: rotating a turbocharger coupled to the engine in a first direction to increase a time engine exhaust gases are in an exhaust manifold; and rotating the turbocharger in a second direction to increase engine output torque. The method includes where the turbocharger is operated in the first direction in response to a temperature or a time since the engine was last stopped. The method includes where the temperature is an after treatment device temperature or an engine temperature.

In another example, the method includes where the turbocharger is hydraulically driven in the first direction opposed to a direction of exhaust flow and where the turbocharger is not hydraulically driven in the second direction consistent with a direction of exhaust flow. Thus, the hydraulic pump rotating the turbine may be hydraulically driven in a single direction. The method includes where a turbocharger waste gate is open while the turbocharger is rotating in the first direction. The method includes where a turbocharger compressor bypass valve is open while the turbocharger is rotating in the first direction. The method also includes where the turbocharger is electrically driven in the first direction opposed to a direction of exhaust flow.

In another example, the method of FIG. 8 provides for operating an engine, comprising: recirculating engine exhaust gases that flow through a waste gate in a direction opposed to engine exhaust flow via rotating a turbocharger turbine in a direction opposed to a direction engine exhaust flow drives the turbocharger turbine. The method further comprises ceasing to rotate the turbocharger turbine in the direction opposed to the direction engine exhaust flow drives the turbocharger turbine in response to an increasing engine torque request. The method further comprises compressing air supplied to the engine via the turbocharger in response to the increasing engine torque request. The method further comprises closing the waste gate in response to the increasing torque request.

In another example, the method further comprises ceasing to rotate the turbocharger in the direction opposed to the direction of engine exhaust flow drives the turbocharger turbine in response to a temperature. The method includes where the temperature is a temperature of the engine or a temperature of an exhaust after treatment device. The method also includes where the recirculating begins a predetermined amount of time after the engine was last stopped.

In another example, the method of FIG. 8 provides for operating an engine, comprising: rotating a turbocharger coupled to the engine in a first direction to compress air entering an intake manifold; and rotating the turbocharger in a second direction to draw exhaust gases from downstream of a waste gate and upstream of an after treatment device to a location upstream of the waste gate. The method includes where the waste gate is open while rotating the turbocharger in the second direction. The method further comprises adjusting a position of a throttle to achieve a desired MAP in an intake manifold of the engine. In some examples, the method further comprises adjusting a position of a compressor bypass valve in response to the desired MAP. The method further comprises opening the waste gate in response to a predetermined duration after engine start. The method also includes where the location upstream of the waste gate is a turbine inlet.

As will be appreciated by one of ordinary skill in the art, the method described in FIG. 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. A method for operating an engine including a turbocharger, comprising:
rotating the turbocharger in a first direction to increase a time engine exhaust gases are in an exhaust manifold; and
rotating the turbocharger in a second direction different than the first direction to increase engine output torque via increasing air flow to the engine.

2. The method of claim 1, where the turbocharger is operated in the first direction in response to a temperature or a time since the engine was last stopped.

3. The method of claim 2, where the temperature is an after treatment device temperature or an engine temperature.

4. The method of claim 1, where the turbocharger is hydraulically driven in the first direction opposed to a direction of exhaust flow and where the turbocharger is not hydraulically driven in the second direction consistent with a direction of exhaust flow.

5. The method of claim 1, where a turbocharger waste gate is open while the turbocharger is rotating in the first direction.

6. The method of claim 1, where a turbocharger compressor bypass valve is open while the turbocharger is rotating in the first direction.

7. The method of claim 1, where the turbocharger is electrically driven in the first direction opposed to a direction of exhaust flow.

8. A method for operating an engine including a turbocharger, comprising:
recirculating engine exhaust gases that flow through a turbocharger waste gate bypassing a turbocharger turbine in a direction opposed to engine exhaust flow via rotating the turbocharger turbine in a direction opposed to a direction engine exhaust flow drives the turbocharger turbine.

9. The method of claim 8, further comprising ceasing to rotate the turbocharger turbine in the direction opposed to the direction engine exhaust flow drives the turbocharger turbine in response to an increasing engine torque request.

10. The method of claim 9, further comprising compressing air supplied to the engine via the turbocharger in response to the increasing engine torque request.

11. The method of claim 10, further comprising closing the waste gate in response to the increasing engine torque request.

12. The method of claim 8, further comprising ceasing to rotate the turbocharger in the direction opposed to the direction of engine exhaust flow drives the turbocharger turbine in response to a temperature.

13. The method of claim 12, where the temperature is a temperature of the engine or a temperature of an exhaust after treatment device.

14. The method of claim 8, where the recirculating begins a predetermined amount of time after the engine was last stopped.

15. A method for operating an engine including a turbocharger, comprising:
rotating the turbocharger in a first direction to compress air entering an intake manifold; and
rotating the turbocharger in a second direction to draw exhaust gases from downstream of a turbocharger waste gate that bypasses a turbocharger turbine and upstream of an after treatment device to a location upstream of the waste gate.

16. The method of claim 15, where the waste gate is open while rotating the turbocharger in the second direction.

17. The method of claim 16, further comprising adjusting a position of a throttle to achieve a desired MAP in an intake manifold.

18. The method of claim 17, further comprising adjusting a position of a compressor bypass valve in response to the desired MAP.

19. The method of claim 18, further comprising opening the waste gate in response to a predetermined duration after engine start.

20. The method of claim 15, where the location upstream of the waste gate is a turbine inlet.

* * * * *